No. 796,580. PATENTED AUG. 8, 1905.
J. JOHNSTON.
COUPLING.
APPLICATION FILED JULY 7, 1904.
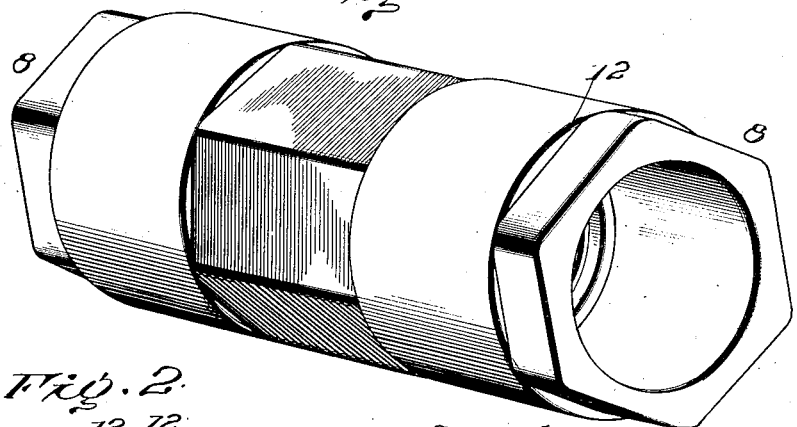
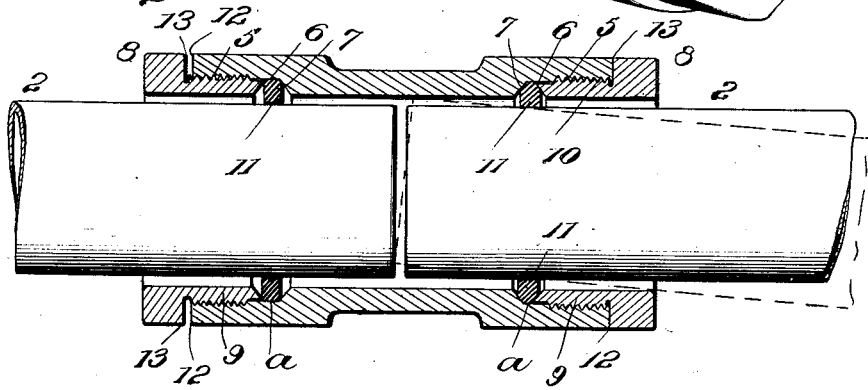
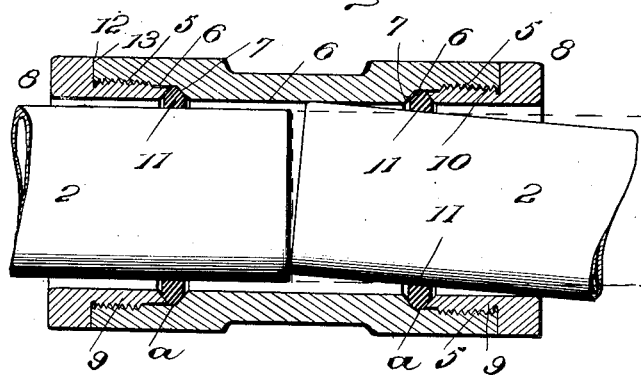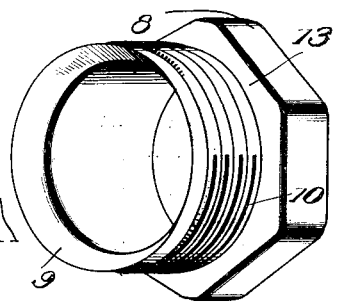

UNITED STATES PATENT OFFICE.

JAMES JOHNSTON, OF BRADFORD, PENNSYLVANIA.

COUPLING.

No. 796,580.      Specification of Letters Patent.      Patented Aug. 8, 1905.

Application filed July 7, 1904. Serial No. 215,620.

*To all whom it may concern:*

Be it known that I, JAMES JOHNSTON, a citizen of the United States, residing at Bradford, in the county of McKean and State of Pennsylvania, have invented certain new and useful Improvements in Couplings, of which the following is a specification, reference being had therein to the accompanying drawings.

My invention relates to improvements in couplings for pipes, rods, &c., the object of which will be explained hereinafter.

In the accompanying drawings, Figure 1 is a perspective view of a coupling embodying my invention. Fig. 2 is a longitudinal sectional view of the same, the packing at the right end being shown compressed, while the packing at the left-hand end is shown non-compressed. Fig. 3 illustrates the lever action of pipe ends in a loose ferrule. Fig. 4 is a perspective view of one of the caps, showing the ground-joint to prevent loosening.

My invention pertains to couplings which are of a sufficient internal cross-sectional size as compared to the outer diameter of the pipes or rods to be connected to fit loosely and to permit a lateral movement or play of the pipes therein when set up for the purpose and to accomplish certain advantages to be presently explained.

Fig. 2 is intended to represent a coupling for a two-inch water or gas pipe 2, which means that the pipe is two inches inside diameter. As shown in the drawings, the relative sizes of the coupling and the pipes allow about one-eighth of an inch lateral play of the latter within the former, and this relative size is intended for a loose fit for pipes that are to be connected up quickly for use without previous treatment—as, for instance, pipes that have been previously used and have become coated with rust or that may have been used roughly with tongs or pipe-wrenches and have become thereby roughened or slightly compressed or for pipes that are to give a little from a straight line when in use, which is constantly required in a pipe-line to accommodate themselves to lateral curves in the right of way or to variations in the pipe-line grades. The illustration shows about the relative length, strength, and diameter of the coupling and pipes for carrying out my invention, though these dimensions may vary without departing from the scope and spirit of the invention. In a coupling of this character the middle point of the ferrule and its ends each way are always two of the three mechanical points in the mechanism of leverage exerted by the lateral movement of the pipes therein. It would almost never happen that a pipe-line would be perfectly straight and the ends of the pipe within the coupling be wholly supported by its packing.

Fig. 3 shows by dotted and solid lines of the pipes that there is always a point in the length of the ferrule where the lumen of the tube between the pipes and the coupling is constant. I desire to call particular attention to the point *a*, where a packing or clamping device may be placed where it would not interfere in any way with the lever action of the pipes within the coupling and where the lever action of lateral movement of the pipes within the coupling would not damage or affect it in any manner.

In specific construction the coupling or ferrule is made in parts. The middle portion is preferably angular on its outside and center to receive a wrench. The ends of this middle portion are screw-threaded interiorly at 5, at 6 not provided with screw-threads, and just beyond the position of the point *a* of the completed ferrule above referred to is the shoulder 7, which forms for each end the inner wall of a recess, the center of which corresponds exactly to the position of the point *a* and of which the opposite wall is formed by the inner end of the corresponding cap. Coacting with the threaded ends of the middle portion of the ferrule are the caps 8, which are provided, preferably, with angular outer portions adapted to receive a wrench by means of which they and the middle portion may be screwed firmly together. The round ends 12 of the middle portion of the coupling and the inner surfaces 13 of the heads 9 of the caps 8 are finished smoothly, so as to form tight joints when they are brought together under pressure applied by means of the wrenches, and thus will hold fast and will not work loose and will practically unite the parts of the coupling rigidly in a union that is solid to all intents and purposes, except that it may be separated again at will. The recess at *a* thus becomes a chamber for use in connection with the packing. The inner ends of said caps 8 are screw-threaded at 10 and adapted to be screwed within the internally-screw-threaded middle portion above described until the said inner surfaces 13 are brought into firm contact with the said round ends 12, as above stated, forming a friction or ground joint that will hold the caps on and prevent their rotating and becoming loose. Another reason why there should be no gap between 12 and 9 is that if there were the coupling would be weak. Fitting within the reduced smooth annular recess 6 is the packing 11, which is of a width slightly greater than that of the recess.

Because the cap 8 is intended to be always put fully on, as above explained, it follows that the recess or chamber 6 will be always of a known size, and since the play of the pipe within the cylinder is also a known quantity it is easy to estimate the size or quantity of the material to be used for packing. In most cases this would be determined beforehand and the packing furnished with the coupling ready made and in place. It would be of such material as the intended use of the coupling might require and may be calculated to merely reach the rod or pipe or to press upon it and reach the uneven and sunken places, or to bear strongly for the purpose of obtaining a clamping effect, or may be made to extend along the length of the pipe within the cylinder, as may be desired.

The first action of the recess would be to form a storage-chamber for the packing material where it would be outside of and beyond the lumen of the cylinder and out of the way of the rod or pipe that is to be inserted. For this use of the chamber the caps would be loosened and the chamber opened just enough. The caps may then be screwed down onto the packing sufficiently to merely hold them so that the coupling may be handled as one piece and yet not enough to compress the packing into the lumen or bore of the cylinder. Thus manufactured and put together it may be then stored and shipped and delivered into the field as though it were one piece with no other covering than a paper wrapper to keep the threads clean, and it would be applied by common labor, being, in fact, only a common slip ferrule which is fixed in place by being screwed up, and which must be screwed to a firm union at 12 and 13 and cannot be screwed any farther.

The second action of the recess (the closing together of its sides) squeezes the packing from the circumference toward the center to diminish the aperture of the cylinder, similarly, in effect, to the iris muscle of the eye, which acts from the circumference toward the center as a curtain to shut out rays of light and diminish the size of the pupil.

The third action of the recess after the cap is fully up is to hold the packing firmly in place in its position relatively to the coupling and to hold the coupling firmly in its place relatively to the line.

This coupling is designed to be used on old pipe as well as on new pipe and may be used on any sort of pipe or on solid rods for any purpose, except that if it is used on high-pressure work it cannot be depended upon to keep the sections of pipe from parting, and this contingency must be met by other and additional means of support, as by anchoring the sections at other points in their length or by covering them, as by earth in a ditch. It is designed so as to have nothing to lose or become loose and nothing exposed to rust or to danger of damage from outside contacts. It is designed to be operatable by one man. There are two wrenches required, it is true, and they work in contrary directions; but it is sufficient if one of them be allowed to engage the ground or the wall of the ditch. There is no material and there are no parts except just what are necessary for primary reasons. One of the primary requisites is strength. The amount of metal in the coupling is estimated and planned according to this consideration alone. There is just what is needed to hold up the line, and there need not be any more. The distribution of the metal, while it has been apparently made to suit the operator, being angular to enable him to use wrenches, is equally well placed with regard to the strength of the coupling, being disposed in longitudinal ribs to resist longitudinal strain and being thickest at the ends, where there is the greatest danger of breakage.

It happens constantly in practice that the coupling must support the line or the line support the coupling, according to the way in which the one or the other happens to meet with support or lack of support from the inequalities of the bed of the line. Also it happens in places, as in rivers, that the couplings must be made heavier and longer than usual, and they may be made lighter than usual when the bed is itself a permanent support. These considerations determine the amount of metal in the coupling, and there is nothing more added for any secondary reason.

A simple loose slip ferrule or coupling has one disadvantage—looseness. My improvement consists in making it of parts and separable, and by this change, with the addition of some packing, I overcome this disadvantage of looseness, and by placing this packing or clamping device at the point where the lumen of the tube between the coupling and the pipe is constant I obtain an additional use of the coupling or ferrule for an additional purpose without altering or interfering with the original use of the ferrule in any manner whatever.

The additional cost of my improvement over the solid loose ferrule is for labor only, and this additional cost does not make it as expensive as other separable couplings now in use, for the reason that this extra labor is all shop-work and what is spent in the shop is saved in the field by the facility and rapidity with which it can be set up. A system by which the most of the work can be done at home is of very great practical importance to the pipe-laying industry.

The recess $a$ for the packing, as before described, is slightly wider than the thickness of the packing, and thus it will be seen that the compression of said packing is predetermined, as the heads cannot be screwed in beyond a certain distance, owing to the ground-wall 13 engaging the ground-wall of the ferrule, and the pressure on the pipe is also predetermined by the width of the packing in respect to the width of the recess $a$.

Having thus described my invention, what I claim, and desire to secure by Letters Patent, is—

1. In a pipe-coupling, the combination with a ferrule having a middle portion of uniform internal diameter and internally-threaded end portions of greater internal diameter, of exteriorly-threaded thimbles adapted to enter said end portions and having flanges at their outer ends adapted to abut against the ends of the ferrule and having internal diameters substantially equal to that of the middle portion of the ferrule, the length of each thimble from the flange to the opposite end being less than the length of an end portion of the ferrule, leaving when screwed home an annular recess of predetermined size within the ferrule, flexible packings occupying said recesses of such size that they will be compressed by said thimbles when screwed home and will then project within the bore of the coupling, whereby pipes of external diameter less than said bore may be connected 2. In a pipe-coupling, the combination with a ferrule having a middle portion adapted to receive the adjacent ends of two pipes, the ends of the ferrule having internal screw-threads and inwardly - extending annular shoulders between the middle portion and said screw-threads, of exteriorly-threaded thimbles fitting the ferrule-threads and having an internal diameter substantially equal to the internal diameter of the said ferrule annular shoulders, the length of each thimble from the flange to the opposite end being less than the distance from the end of the ferrule to the said ferrule annular shoulder, thus leaving when screwed home an annular packing-recess of predetermined size within the ferrule, flexible packings occupying said recesses of such size that they will be compressed by the said thimbles when screwed home and will then project within the bore of the coupling, whereby pipes of external diameter less than the bores of the thimbles and ferrule may be connected.

In testimony whereof I affix my signature in presence of two witnesses.

JAMES JOHNSTON.

Witnesses:
HERMAN H. NORTH,
MYRON MATSON.